May 16, 1939.　　　　T. A. HODGDON　　　　2,158,754
APPARATUS FOR THE MANUFACTURE OR PRODUCTION OF LAMINATED SHEET MATERIAL
Filed Aug. 25, 1936　　　2 Sheets-Sheet 1
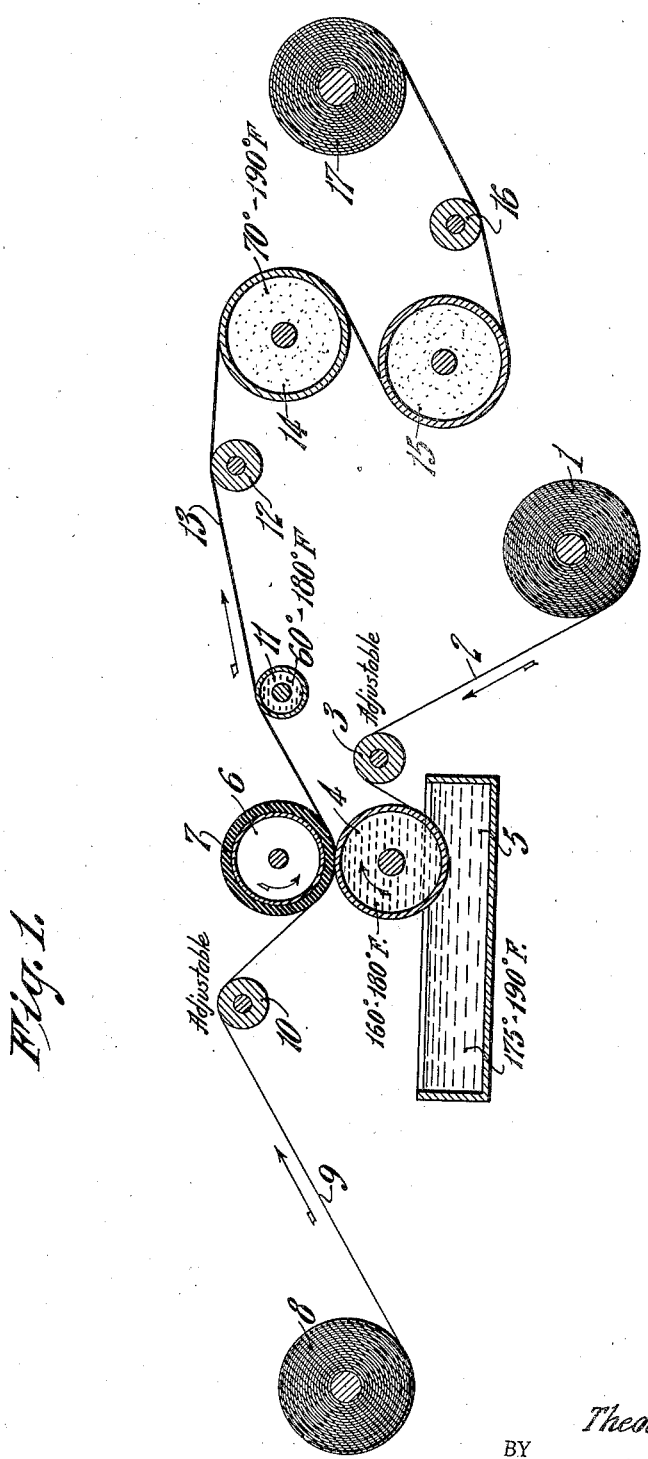
INVENTOR,
Theodore A. Hodgdon,
BY Harry W. Bowen
ATTORNEY

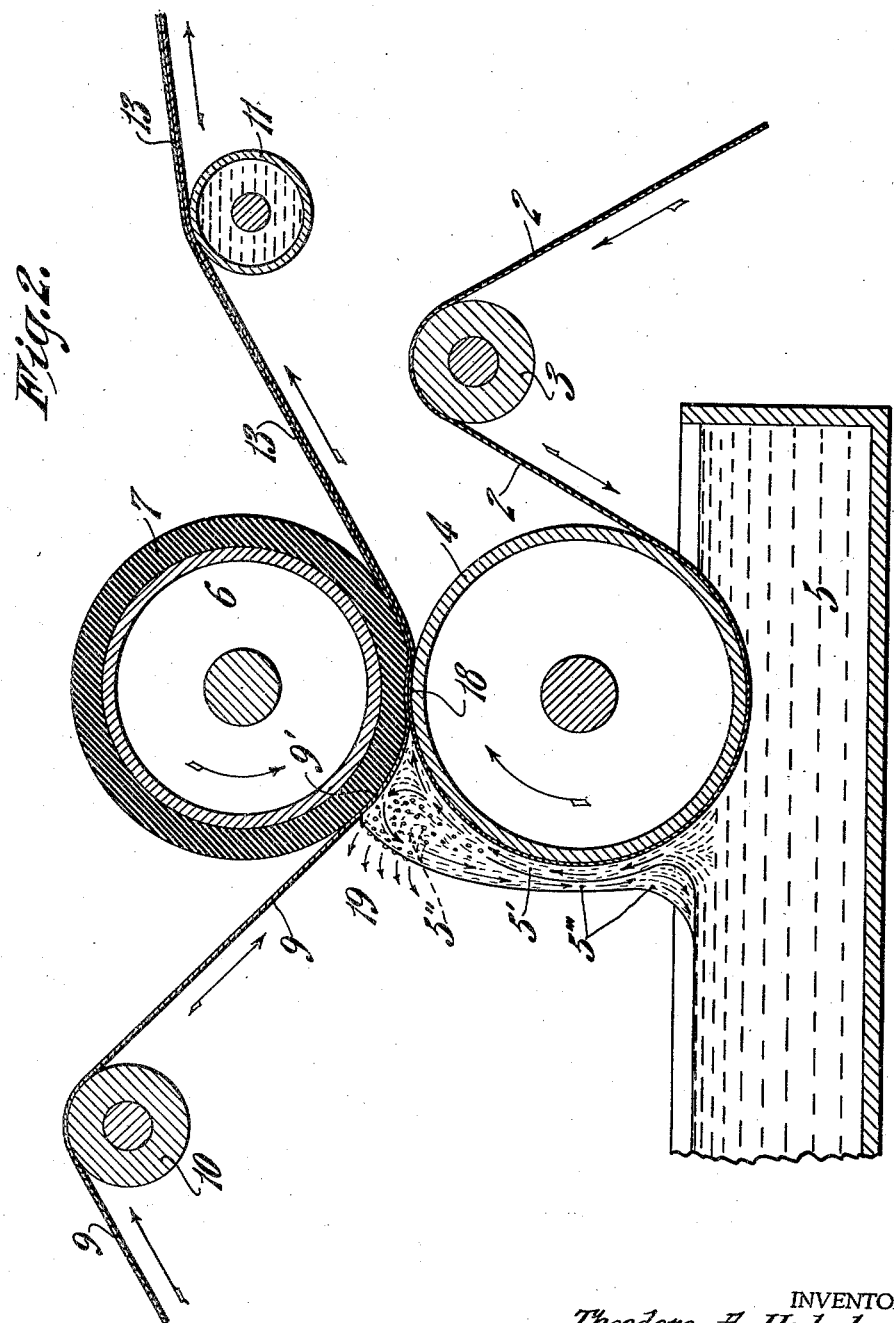

UNITED STATES PATENT OFFICE 2,158,754

APPARATUS FOR THE MANUFACTURE OR PRODUCTION OF LAMINATED SHEET MATERIAL

Theodore A. Hodgdon, Whitingham, Vt.

Application August 25, 1936, Serial No. 97,733

3 Claims. (Cl. 154—37)

This invention relates to the method of and apparatus for the manufacture, or production, of laminated sheet material.

This invention is particularly designed for making laminated sheet material from glassine, which is a paper made from thoroughly hydrated sulphite pulp, and having highly calendered surfaces, so that it is substantialy grease-proof and non-absorbent of wax. This invention offers a method for producing a kind of laminated sheet material similar to that described in a United States Patent to Beecher, #1,936,375, dated November 21, 1933, but it has been found possible by my improved method to obviate certain objections to his laminated sheet material by coating both webs with wax before the two sheets are pressed together, and also by the positive prevention of any air entering the space between the sheets, by a novel means, as hereinafter described.

An object of the present invention is to supply, for wrapping and bag making purposes, a laminated sheet material which will be an improvement from a standpoint of flexibility, that is, more able to withstand bending, folding and creasing, as on a bag or wrapping machine, without easily separating, opening or coming apart at the creases, or folds. This is accomplished by applying a coating of wax, which will remain plastic when cooled in a thin film, on both of the opposing surfaces which are to be pressed face to face, thus adding to the flexibility of each sheet, even before lamination, thus adding to the total or final flexibility of the laminated sheet. Flexibility of the sheet of laminated material is also aided by the positive prevention of air entering the space between the two sheets, by clearing the surfaces of all air before the two sheets, touch each other, or come into contact in the pressing together action. When wax is used as a bonding element between two sheets of glassine, the film of wax is not wholly relied upon to effect a complete and thorough adhesive result, but the pressure of the atmosphere performs a definite function in keeping the two sheets face to face and in close contact. Hence, the elimination of all air from between the two sheets is essential, or a neutralizing action of air pressures takes place in those spots where air was not eliminated. In other words, the wax film between the sheets tends to serve mainly as a bond to keep out air, and of course, this bond can function perfectly only if all air is removed from the surfaces of the paper before the pressing together takes place, so that the film of wax remains unbroken by tiny air bubbles.

Another object of the invention is to make it possible to obtain a more uniformly transparent laminated sheet material; that is, one which will be free from all visible signs of lamination. This is accomplished by preventing the entrance of any air to be present between the finished laminated sheets, so that there shall be no tiny air bubbles to mar the transparency of the laminated sheet, and this transparent effect is also accomplished by a more perfect distribution of the wax film between the sheets by pressing the two sheets together between pressure rollers at a time when the wax coating on both sheets is in a hot liquid and free flowing state. Thus, the film of wax is smoothed out at the same time the sheets are pressed together, and there shall be no relatively thick and thin places in the wax film to alternately deaden and brighten the appearance of transparency.

Another object of the invention is to produce a laminated sheet material, which, when hot wax is used for the film between the sheets, will be more firmly adhered together than those laminated sheet materials now manufactured with similar waxes. This is accomplished by the very positive elimination of all air from the surfaces of the paper which are to be pressed together simultaneously with the application of the hot wax coating to the two opposing surfaces at the same time, so that the film of wax may flow into all the tiny depressions of the sheet, and the film of wax is therefore unbroken, and is allowed to do its task more effectively. To the naked eye, the surface of a sheet of glassine paper may appear smooth, but actually there are, to every square inch, hundreds of tiny irregularities or marks, caused by the Fourdrinier wires, press rolls, drying felts, and calendering rolls used in the paper making process. Unless these tiny depressions, or marks, are all cleared of air before the two sheets are pressed together, it has been found that the wax coating distribution will be incomplete; that is, not in true film form, and therefore, present a broken and incomplete bonding element, with subsequent sacrifice of adhesive qualities, as well as the aforementioned irregular appearance of transparency.

A further object of the invention is to make possible the production of the improved laminated sheet material at higher speeds than are possible with known methods, by lessening the change for breakage of the webs during said high speed operation, which is an important factor when running those kinds of glassine which are of very light weight, and highly transparent, thus, being delicate, when subject to the tension necessary to high speed operation. This is accomplished by tensioning the webs by friction at several points, after these webs leave the supply rolls, thus allowing the webs to absorb the tensioning at several points, rather than all at the supply rolls. It is also accomplished by the very course which the paper takes in this design of machine, which is around more large than small rolls, which smooths the paper webs and obviates many chances for wrinkles which might cause breaks in the webs, with costly interruptions of production.

The principal object of the invention is to obtain a more perfect lamination of the two sheets of glassine, which may be both transparent, or both opaque, or one opaque and one transparent, by the elimination of all air from between the sheets. This elimination of air is before the two sheets have been brought together, and is accomplished by the fact that as a liquid is raised in temperature, its capacity to retain air, or gases, is lessened materially. In this invention, a moving mass of hot liquid wax is held at, or near, the nip of the pressure rollers, and the approaching webs must be passed through this virtual dam of turbulent wax, in such a manner that while the back sides of the webs remain perfectly dry, the opposing surfaces, which are to be pressed together, are wiped free of all air. The dam of liquid wax is constantly undergoing a change in temperature, as one edge of it is cooled—a small amount by the arrival of the cool paper web, while the inner portions of the mass are constantly heated by the arrival of hot wax which is carried up by the action of the rotation of the lower pressure roller, with a subsequent rise in temperature of the wax which is travelling at this point in the opposite direction to the web travel. Thus, the air is wiped off the sheet and thrown back into the atmosphere and a coating of wax displaces the air which was lodged in the small recesses of the surface of the sheet. The amount of hot wax which is carried up to the moving mass of wax which forms the dam, is increased automatically, as the speed of the operation increases. Hence, regardless of speed, the clearing action of the dam of wax is constant in relation to the temperature of the wax in the receptacle below the roll, which acts as a carrier upward.

Means is provided for cooling or drying the laminated sheet, after it leaves the pressure rolls and a second roll 12 is provided spaced some distance from the cooling or drying roll 11 of smaller diameter. The laminated web, from this second roll, now passes around two drying rolls 14 and 15, preferably of a temperature of about 70° F., when waxes are used. A takeup, or winding roll for the completed sheet is employed and a suitable tension roller interposed between the takeup roll and the cooling rolls.

So far as I am aware, the machines now in use for making laminated paper, do not effectually expel the air between the sheets during the process of manufacture.

In my process of making the laminated product from glassine, a better product is obtained by the reason of the fact that the wax employed is about 190° and is not allowed to cool, before being simultaneously applied to both of the opposing, or opposite faces of the two sheets of material. In other words, the two sheets of glassine paper are drawn through, or must pass through a dam of hot flowing liquid wax an instant before they are pressed together face to face by the two pressure rolls. The nip of the pressure rolls will allow only a prescribed quantity of the hot wax to pass through with the two webs and the excess is thrown back with the result that a dam effect is constantly produced, at the nip of the pressure rolls.

By suitably tensioning the webs of moving paper on the pressure rolls, the outer surfaces are kept dry, as they should be, at all times.

My process and apparatus will be clearly understood from the accompanying drawings and the specification, and particularly pointed out in the appended claims. An important feature of my process is the simultaneous application of heated wax to both of the oppositely located surfaces.

Referring to the drawings:—

Fig. 1 is a diagrammatic view, showing the two supply rolls, the pressure rolls, the lower one of which is immersed in a bath of hot liquid wax around which one of the sheets passes and the other roll carrying the second web of sheet material which receives the hot wax from the sheet on the first roll. This view also shows the adjusting, cooling and takeup rolls.

Fig. 2 is an enlarged view of the two pressure rolls illustrating the damming hot wax means for expelling the air.

Referring to the drawings in detail:—

1 indicates a supply roll of one of the webs of glassine, or hydrated calendered sulphite paper pulp sheet material, provided with suitable means, (not shown), for regulating the tension of the web, as it is being drawn from this roll. The web 2, from this roll, passes over the adjustable and guide tension roll 3, which is supplied with a brake (not shown), where it then passes downward and under the lower pressure roll 4, which roll is partially immersed in a bath of hot liquid wax, as paraffin, at a temperature of 175° to 190° F. The tensioned web 2 closely hugs, or is tightly placed in contact with the roll 4 to prevent the wax from gaining access between the web and the lower pressure roll 4. This roll is supplied with steam, or water, at a temperature of 160° to 180° F. Located above the pressure roller 4 is a second pressure roll 6 what is provided with a rubber, or elastic cover, 7. 8 indicates a second supply roll of paper. This roll is also supplied with a brake or tensioning device, usual in paper converting machines, to control the unwinding movements of the paper. 9 indicates the web from this roll, which passes over an adjustable tensioning roll 10 which is supplied with a brake, (not shown), for the web 9. It now passes under the rubber covered roll 6, where it comes in contact with the web 2, from the roll 1. Located a short distance from the upper pressure roll 6 is a cooling roll 11. The temperature of this roll is approximately 60° F., when a wax is used. The web then engages the smaller roll 12, which may be adjusted and braked to vary the tension of the two webs of glassine paper that are now in a laminated condition, designated by the reference numeral 13. The laminated web 13 now passes over, and under, the cooling and drying rolls 14 and 15, which are kept at a temperature of about 70° F., when waxes are used. The web now passes under the roll 16 adjusting the tension, as it leaves to the takeup winding roll 17.

One of the important features of the present invention is the comparatively short travel of the web 13 to prevent breakage before it reaches the roll 14. The tension is adjusted by means of the roller 12 and the steam heated or water cooled roller 11, and by an adjustable rewind belt, common to such machines. Referring to the enlarged view, it will be noticed that the web 2 of glassine paper, as it passes around under the lower pressure roll 4, which is driven at a fairly high velocity, takes up a copious quantity of the hot liquid wax 5, as shown at 5', which is thrown directly against the underside of the opposing web 9 of glassine paper, whereby both of the opposing surfaces are thoroughly coated with the hot wax, or other material, at the nip, or pressure point 18 of the two rolls and the damming effect of this hot wax serves to prevent the air bubbles from gaining access between the sheets of papers that are being subjected to the laminating process. Also, the short travel of the sheet, or web 2, from the hot wax 5 to the point 18, prevents any material cooling of the wax, or adhesive substance, thus effectually keeping the liquid mass of wax 5' at a high enough temperature to dislodge from the surface of the web 9 all air, which is subsequently discharged into the atmosphere, as shown by the arrows 19. It will be observed that the flow of the hot wax is in a direction opposite to the direction of travel of the web 9, when it is thrown against its inner surface, as indicated at 9'. The air bubbles in the wax are indicated at 5''. The downward flow of cooled wax is indicated by the arrows 5'''. It is reheated, when it reaches the supply 5.

It should be stated that the hot wax actually catches some of the air bubbles and throws them back in the direction of the arrow 19.

It is a well known fact that a liquid at a high temperature will retain just so much and no more air, plus the fact that the wax is being rolled backward in opposite direction to the travel of the web 9 that makes the elimination of air possible.

It should be stated that a cooling temperature of 70° only is used in the rolls 11, 14 and 15, when waxes are used.

The hot wax, in the receptacle is carried by the web or sheet 2, as it emerges from the supply and then thrown therefrom onto the web 9, as shown.

What I claim is:

1. In combination, in a machine for laminating glassine paper, a pair of pressure rolls, a receptacle containing hot liquid wax at a temperature between 175°–190° F. in which one of said rolls is partially immersed, means for feeding two webs of glassine paper to said rolls in opposed relation to each other with one of said webs passing through said receptacle and around said immersed roll and separating said immersed roll from said wax, whereby, as the pressure rolls are driven, opposing surfaces of said glassine paper will be coated with hot wax adjacent the nip of the pressure rolls, an adjustable tension roll for imparting high tension to said immersed web of glassine for excluding the hot wax from between the immersed pressure roll and the web of glassine, whereby only one surface of the web passing through the receptacle will receive a coating of the wax.

2. An apparatus for laminating glassine paper comprising a receptacle containing hot liquid wax at a temperature between 175°–190° F., upper and lower pressure rolls, the lower roll being partially immersed in said liquid wax, the upper roll being provided with a yieldable resilient covering, means for guiding a web of glassine around said lower pressure roll and through said receptacle and separating said lower roll from said wax, means for adjustably tensioning said web to maintain a high tension in said web to cause the web to hug said pressure roll, to prevent contact of the wax with the upper surface of said web, means for guiding a second web of glassine into the nip of said pressure rolls, and means for adjustably tensioning said second web to maintain said second web under high tension.

3. In combination, in an apparatus for the purpose described, a pair of driven pressure rolls, a supply tank of heated liquid wax, one of said pressure rolls being partially immersed in said tank and around which roll a web of sheet material is tightly drawn to prevent contact of said wax on said roll, and a second web of sheet material located above the nip of the rolls and at an angle of approach different from the angle of approach of the first web, the first web serving, as it travels, to carry upward the hot liquid wax against the second web to form a dam effect and expel any air contained in the wax, the surplus wax flowing by gravity back into said supply tank, as described.

THEODORE A. HODGDON.